(12) United States Patent
Frazier et al.

(10) Patent No.: US 6,688,461 B1
(45) Date of Patent: Feb. 10, 2004

(54) FOOD CUT-UP SYSTEM

(75) Inventors: Rocky S. Frazier, Guntersville, AL (US); Jeffrey A. Pyatt, Boaz, AL (US)

(73) Assignee: Fabco Equipment Company, Inc., Huntsville, AL (US)

( * ) Notice: Subject to any disclaimer, the term of this patent is extended or adjusted under 35 U.S.C. 154(b) by 99 days.

(21) Appl. No.: 09/911,110

(22) Filed: Jul. 23, 2001

(51) Int. Cl.[7] .............................................. B65G 29/00
(52) U.S. Cl. .................. 198/867.09; 452/165; 452/177; 452/196; 452/197
(58) Field of Search ......................... 198/67.09, 803.12; 452/177, 196, 197, 165

(56) References Cited

U.S. PATENT DOCUMENTS

| | | | |
|---|---|---|---|
| 1,781,750 A | * 11/1930 | Dodge et al. ............... | 198/841 |
| 4,385,419 A | 5/1983 | Cantrell .......................... | 17/11 |
| 4,886,156 A | * 12/1989 | Records et al. ............. | 198/841 |
| 5,492,503 A | * 2/1996 | Davis .......................... | 452/177 |
| 5,535,876 A | 7/1996 | Fortenberry et al. ... | 198/803.12 |
| 5,782,340 A | * 7/1998 | Dolan ......................... | 198/841 |

* cited by examiner

Primary Examiner—Joseph E. Valenza
(74) Attorney, Agent, or Firm—Waddey & Patterson; Larry W. Brantley

(57) ABSTRACT

Apparatus for processing both whole and portioned food products along a processing line for part cut-up and deboning in a mass production system. The apparatus consists of numerous food carriers, evenly spaced over a subscribed distance, connected by means of a mounting block, which is connected to a thermal plastic chain or a stainless steel chain by means of locking pins. The apparatus also includes food product take-away conveyors for the meat portions and scraps removed from the carcass. The carrier conveyance and the take-away conveyance have been incorporated into a common support frame. The apparatus will allow interchangeable food carriers for the type of process desired. Each food carrier is unique to the type of process being performed along the processing line. The chain is designed in such a manner as to allow vertical movement within a specified elevation change. Each food carrier is attached to a mounting block, which becomes an attachment to the chain. The mounting block is designed with hold-down tabs (extended flanges), which slide through longitudinal block guide channels, which in turn provides stability in both lateral directions. Additionally, each food carrier is rigidly mounted in a longitudinal position to permit consistent viewing and a rigid carving position of the food product part being manipulated.

14 Claims, 23 Drawing Sheets

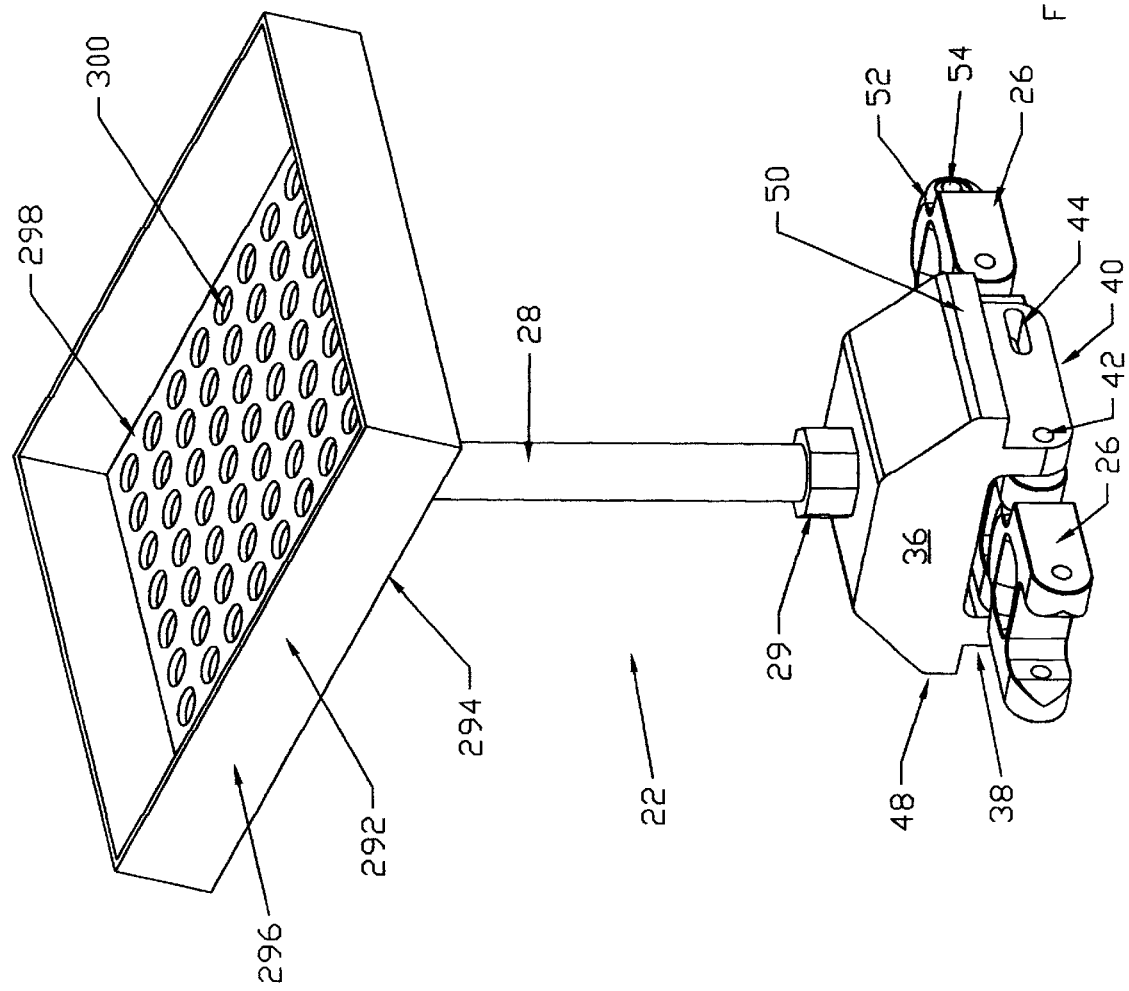

FOOD CUT-UP SYSTEM

FIELD OF THE INVENTION

The present invention relates to the removal of parts and portions of meat from poultry, beef, pork, fish, and other various food products by manually cutting and carving the parts and portions from the carcass. Particularly, the present invention relates to the apparatus for presenting food products to a food processing person to remove whole parts, segmenting whole parts, and portions of meat from carcasses of food products and transferring these parts on a take-away conveyance. Still more particularly, the present invention relates to an apparatus, which supports both whole and portioned food products in a rigid carving position with unique food product process carriers and which further allows configuration of the processing line with multiple specified radius curves and multiple elevation changes.

BACKGROUND OF THE INVENTION

Prior food conveyance apparatuses are known to the art. One such conveyor is disclosed in U.S. Pat. No. 4,385,419, issued to Cantrell. The conveyor is formed of rigid segments, which interlock to form a continuous conveyor platform, which extend laterally into guide rails to stabilize the platform upon which the poultry carcasses are supported. The conveyor segments are configured and connected so that the conveyor may only travel along a straight processing line. The conveyor is only flexible in a single direction, so that it may invert when it reaches the end of the processing line to travel back to the beginning of the line. The chicken carcasses are supported on deboning "horns," which are rigidly mounted on the conveyor platform. The conveyor disclosed in Cantrell presents a number of problems. First, a processing line using the disclosed apparatus may only be positioned along a straight line. It cannot be positioned around a curve to optimize the use of available floor space. Additionally, the platform disclosed is incapable of ascending along an incline or decline. This presents problems in terms of overall design of the integrated processing plant, in that it limits the capability to raise and lower a conveyor to accommodate a second conveyor crossing beneath it.

A further problem with a conveyor of the type disclosed is the inability to thoroughly clean the conveyor. Debris that collects along the edges of the conveyor may not be easily dislodged. The area between the adjacent segments of the conveyor platform is inaccessible for cleaning, except at the ends of the processing line, where the conveyor inverts to change its direction of travel.

Another such conveyor system is disclosed in U.S. Pat. No. 5,535,876, issued to Larry Fortenberry, et al. The conveyor is formed by connecting a plurality of poultry mounts to each other using a chain of cooperative links to form a continuous conveyor. The pivotal junctures between each of the cooperative links are configured so as to provide both lateral and vertical flexibility, allowing the conveyor to be positioned along curves and inclines. Each of the links has a linking post extending from one side and a pair of linking arms extending from the opposite side. The linking arms are spaced apart to receive the linking post of an adjacent link. The links are connected by pins, which extend through apertures in the linking arms and through a bore in the linking post of the adjacent link. The diameter of the bore in the linking post is larger than that of the pin, so that the connection is flexible laterally. Each of the poultry mounts includes a base block, which is stabilized by laterally extending rectangular flanges positioned to slide along guide channels in guide members extending along the conveyor frame. Additionally, each mount includes freely rotatable member for holding the poultry carcasses on the mount. The conveyor disclosed in U.S. Pat. No. 5,535,876 presents a number of problems. First, the support structures for the conveyor frame is so designed as to only consider support needs for said conveyor. Therefore, when adjacent take-away conveyors are mounted relatively close for proper workstations, an unsanitary condition occurs, as the metal surfaces of both frameworks are typically too close for proper cleaning methods.

A further problem with a conveyor of the type disclosed is the ability of the carcass mount to rotate freely. Because the mount can rotate freely, the proper resistance necessary to make a cut on a poultry part or meat portion is not possible. As a cut is being made, the carcass tends to move away from the cutting edge. In addition, the carcass mount design only supports a small amount of the available inside surface area of a carcass leaving the ability of the carcass to move on the support mount. Furthermore, the support mount is not easily and readily adaptable for conversion to other types of processing other than deboning.

Additionally, the mount is an integral part of the chain, which is manufactured by others. Removing a pre-manufactured link and replacing with a customized module jeopardizes the integrity of the entire continuous chain.

Furthermore, the groove in the guide rail in which the base module flanges are supported is small in size creating difficult sanitary conditions. In addition, because the flange extends in a rectangular shape away from the rectangular base module, the physical area of support for the poultry mount is very small in relation to the overall size of the poultry mount and, therefore, supplies only miniscule support for the poultry mount. Such structure enhances the likelihood that breakage of the support flange occurs.

SUMMARY OF THE PRESENT INVENTION

The principal object of the present invention is to provide a versatile food processing line. The versatility is gained by various and unique food product carriers with each product carrier being designed in particular for a specific process. Each food product carrier provides rigid stability for proper cutting and carving of meat portions. Additionally, each food product carrier allows the highest yields of cuts and carves to be obtained by providing a food carrier, which compliments the shape and/or contour of the food part or carcass.

Another object of the invention is to provide a versatile food processing line, which can be designed to accommodate plant layout configuration needs involving flexibility to travel along radius turns and elevation changes.

Still another object of the invention is to provide a food processing line, which may be easily and thoroughly cleansed.

Yet another object of the invention is to provide a food processing line, which may be integrated into expanded or reduced processing capacity by means of adding or removing generic sections of conveyance.

A feature of the invention is the design of the common frame support system. By combining the carrier conveyance system with the take-away conveyance system, a tremendous amount of redundancy in leg frame support is eliminated thus reducing the amount of sanitizing required. Additionally, the proximity of the take-away conveyance is positioned in an optimum position in regards to the worker process station.

These and other objects of the present invention are accomplished by providing a continuous traveling chain, which consists of cooperative links. The pivotal junctures between each of the cooperative links are configured so as to provide both lateral and vertical flexibility. The cooperative links consists of a linking post on one end and two linking arms on the opposite end spaced apart so that the linking post of an adjacent link will fit between the two arms and the linking post of the adjacent link. The linking post is bored slightly larger than the diameter of the pin, therefore creating the ability of lateral and vertical movement. Each food product carrier is supported by a mounting block, which is designed with flanges facing in a downward direction and whose inside dimension matches the outside dimension of the associated chain link. The mounting block is secured to the chain link by means of extending the stainless steel pins to the length equal to the outside dimension of the mounting block's downward flanges. Each mounting block is designed with hold-down tabs extending laterally from the mounting block. The mounting block hold-down tabs extend into guide channels of a pair of guide rails which are mounted on opposite sides of each chain. The hold-down tabs are configured in a wedge shape configuration and extend into similarly but inversely configured wedge shaped grooves forming the guide channels. This wedge shape offers the proper amount of necessary support surface area, while not having a detrimental effect of increased friction.

A threaded mounting shaft is screwed into the mounting block and secured with a lock nut. The shaft then extends to a specified length needed for supporting the food product carrier. The product carrier is then secured to the mounting shaft by means of a threaded fitting and stainless steel lock nut. The food product carrier is so designed as to allow the food product to be presented in front of the worker position in a fixed and rigid manner. The support structure frame is located directly below the take-away conveyor. Small tube-like supports cantilever from the main support structure to allow reinforced support to the food product carrier conveyance system. The side frame member of the carrier conveyance system is common and is shared with the side frame member of the take-away conveyor.

BRIEF DESCRIPTION OF THE DRAWINGS

The foregoing objects and advantages of the present invention will be more readily understood by one skilled in the art by referring to the following detailed description of preferred embodiments and to the accompanying drawings which form a part of the disclosure, and wherein:

FIGS. 5–23 are perspective views of different embodiments of the food carriers of the present invention.

DESCRIPTION OF THE PREFERRED EMBODIMENTS

Figure 1:
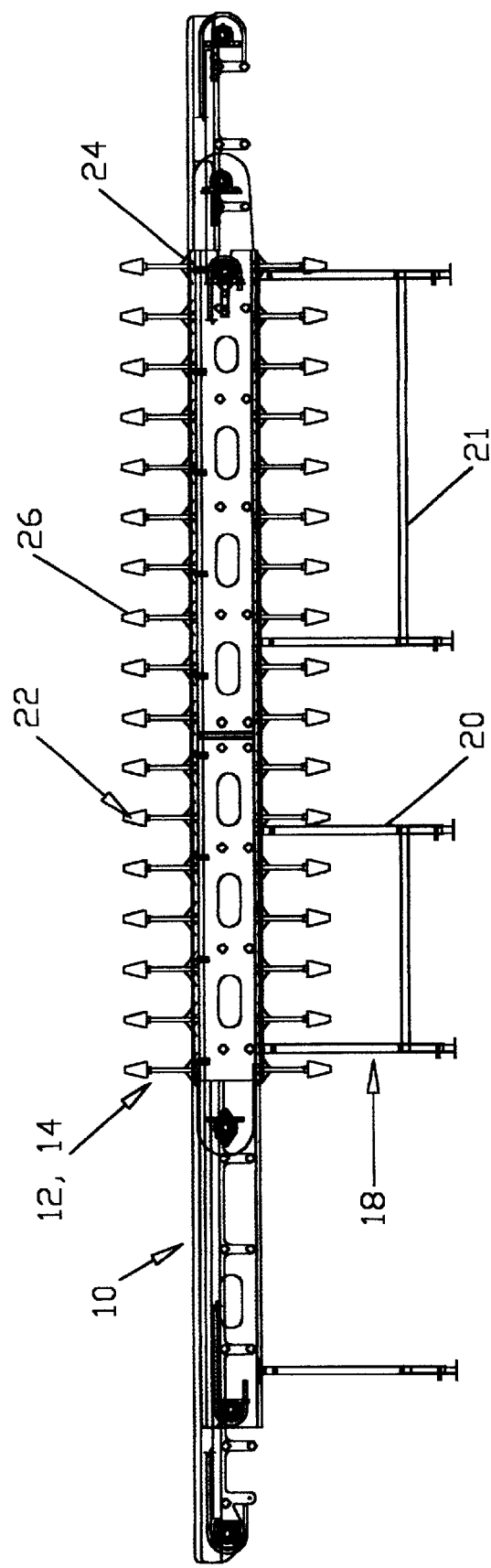
FIG. 1 an elevational side view of the food processing line system of the present invention and illustrates a plurality of spaced food carriers mounted to a food carrier conveyor mechanism supported on a frame.
Figure 2:
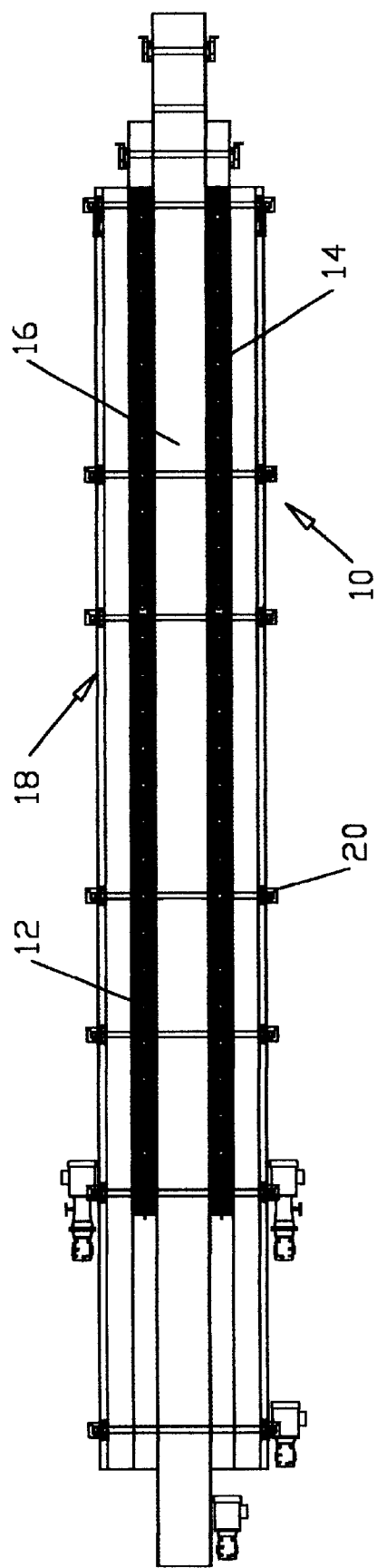
FIG. 2 is a plan view of the food product carrier conveyance system of FIG. 1 and further illustrates a food take-away conveyor mounted between a pair of spaced food carrier conveyors.
Figure 3:
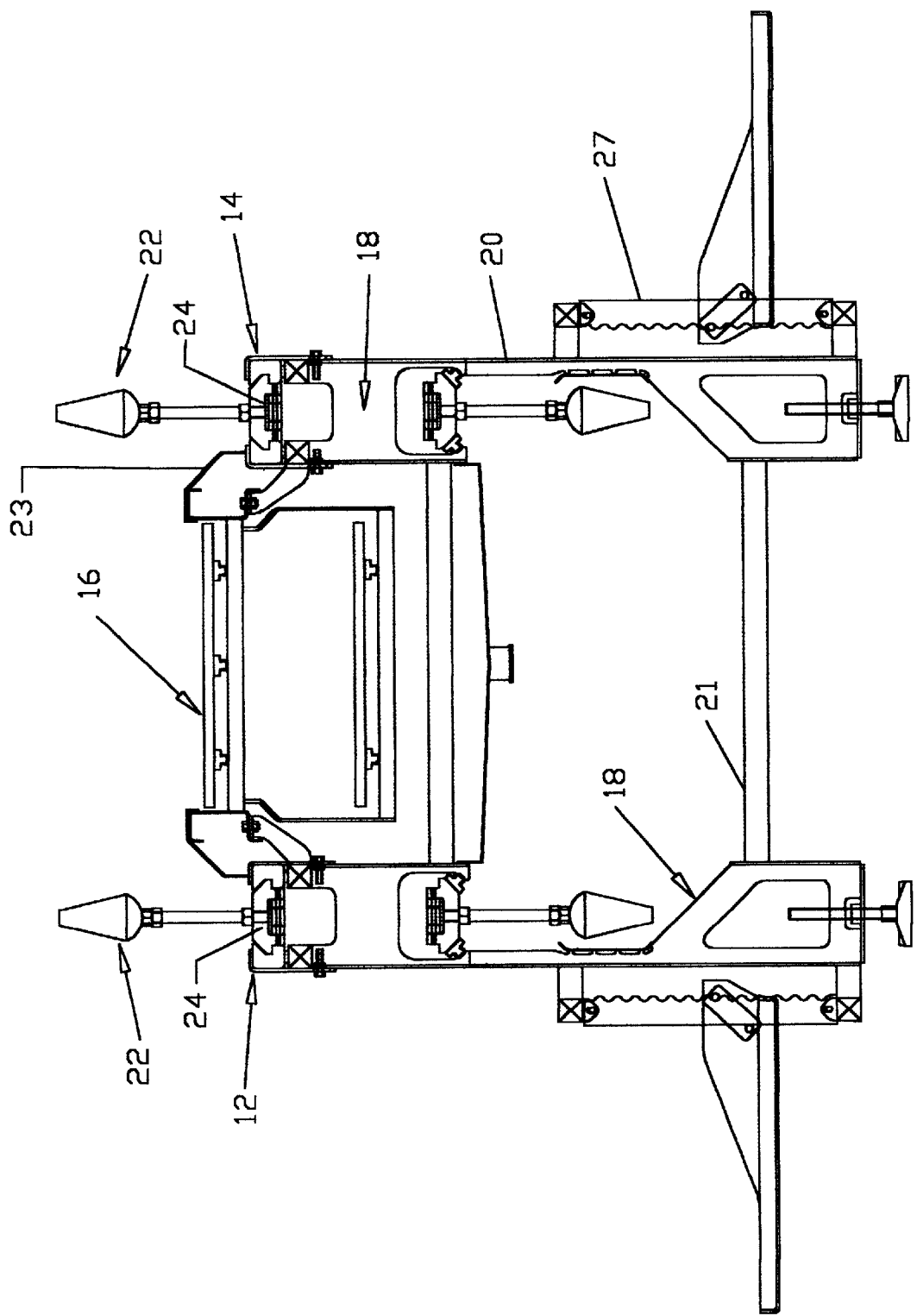
FIG. 3 is an end elevational view of the apparatus of FIG. 2 illustrating two food carrier conveyors and an intermediate food take-away conveyor. A common support assembly is shown supporting the three conveyors.

As may be seen in FIGS. 1, 2 and 3, apparatus 10 of the DESCRIPTION OF THE PREFERRED EMBODIMENTS of the present invention includes a plurality of conveyor systems 12, 14 and 16 supported from a common frame 18 having vertical frame components 20 and horizontal frame components 21 placed in spaced strategic locations along the length of the frame 18 for common frame conveyance support of the conveyor systems. A plurality of food carrier assemblies 22 are joined together by a chain drive 24 (more clearly shown in FIG. 4) having a plurality of cooperative links 26. Each food carrier assembly 22 includes a food support member 26 which is connected to a threaded mounting shaft 28, of a subscribed length, by means of a stainless steel nut 30. A second similar nut 32 is located next to the first nut 30 to non-rotatably lock in place shaft 28 of the food carrier assembly 22. The shaft 28 then extends in threaded relation into the top portion 34 of a mounting block 36. A third stainless steel nut 29 is threaded on the shaft 28 to lock in place each food carrier assembly 22 to the mounting block 36.

Figure 4:
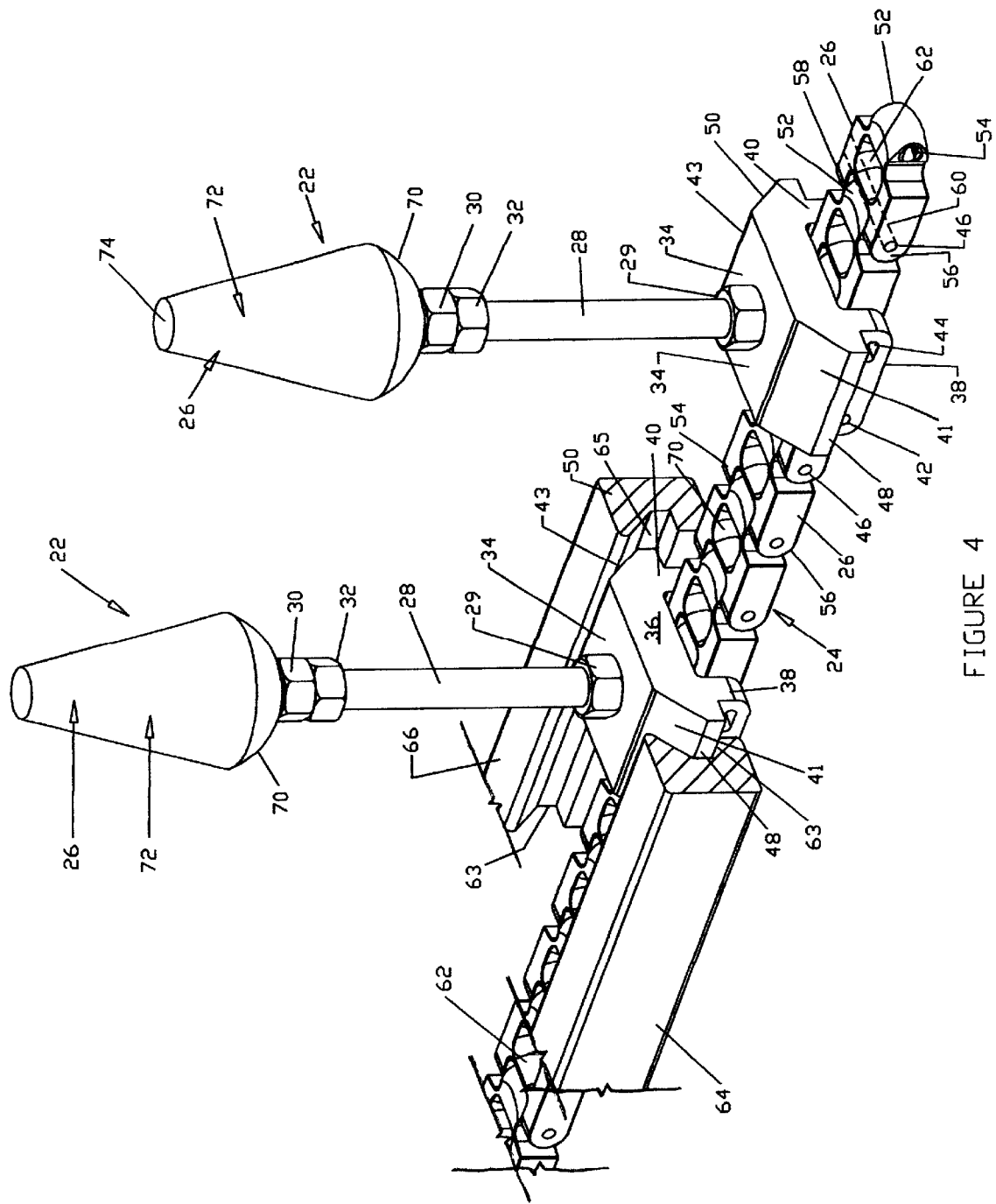
FIG. 4 is an enlarged perspective view of the embodiment of a food carrier shown in FIGS. 1, 2 and 3 and illustrates a pair of food carriers mounted on mounting blocks which are affixed to a chain drive assembly of the food carrier conveyors.

As best shown in FIG. 4 each of the mounting blocks 36 includes a substantially wedged shaped configuration with downward extending flanges 38 and 40 extending on opposite sides of chain drive 24. A necessary distance is maintained between the links 26 of the chain drive 24 and mounting block 36 for sanitary reasons. The downward extending flanges 38 and 40 have spaced bores 42 and 44 which match the center distances of stainless steel connecting pins 46 of chain assembly 24. The mounting block 36 also has laterally extended flanges 48 and 50 which bear a wedge (dovetail) shape defined by a pair of upwardly sloping surfaces 41 and 43 which slope upwardly to top surface 34 of block 36.

Support shaft 28 is affixed to and extends substantially perpendicular from the upper surface 34 of the mounting block 36. The diameter of shaft 28 is equal throughout. Both upper and lower portions of the shaft 28 terminate in a threaded portion to receive nuts 30, 32 and 39 in threaded relation.

The cooperative links 26 used to join the food carrier assemblies 22 are similar to those described in U.S. Pat. No. 3,641,831 issued to Palmaer. As best shown in FIG. 4 each link 26 has a linking post 52 with a bore 54 defined therethrough, and a pair of linking arms 56 and 58 with coaxial apertures 60 defined therethrough. The linking post 52 extends outwardly from the link 26 on the end opposite from the linking arms 56 and 58 and is dimensioned to fit between adjacent link's arms 52 and 54 of an adjacent link 26. The links 26 are connected to each other using a plurality of pins 46, which extend through the apertures 60 in the linking arms 52 and 54. The diameter of the bores in the linking posts 52 of the cooperative links 26 have a dimension which exceeds that of the diameter of the pin 46 sufficiently so that the pin 46 may move laterally with in the bores additionally slots 44 may be elongated. Each link 26 has a central aperture 62 formed in the body of the link, for engagement with the teeth of the sprocket wheel.

As shown in FIGS. 1 and 4, the food carriers 22 are spaced apart along the food carrier conveyor, and are connected by the plurality of links 26. To provide adequate stability for cutting and carving, the mounting blocks 36 are mounted for slidable movement along parallel guide members 64 and 66 which extend along the length of the conveyor frame (Only a portion of the guide members are shown in FIG. 4). The stabilizing lateral flanges 48 and 50 of the mounting blocks 36 extend into tracks 63 and 65 of the opposite guide members 64 and 66. The links 26, however, do not extend laterally to meet the guide members 64 and 66 or the conveyor frame, providing an open configuration, which facilitates cleaning of the conveyor. A drive 68 (FIG. 1) rotates a sprocket wheel (not shown), which engages the central apertures 62 in the body of the links 26 to urge the conveyor along the frame 18.

FIG. 4 also shows one embodiment of a food product carrier used for conveying whole and portions of whole poultry. A food support member 72 supporting food on the carrier includes a lower portion 70, which is a dome shape. At a point tangent to the dome, the middle portion 72 of the food support member is connected to the dome portion 70. The middle food supporting portion maintains a conical shape starting with a smaller diameter on the top 74 and ending with a larger diameter on the bottom. The upper portion 74 is a cap with a matching circumference as the top of the middle portion 72.

Figure 5:
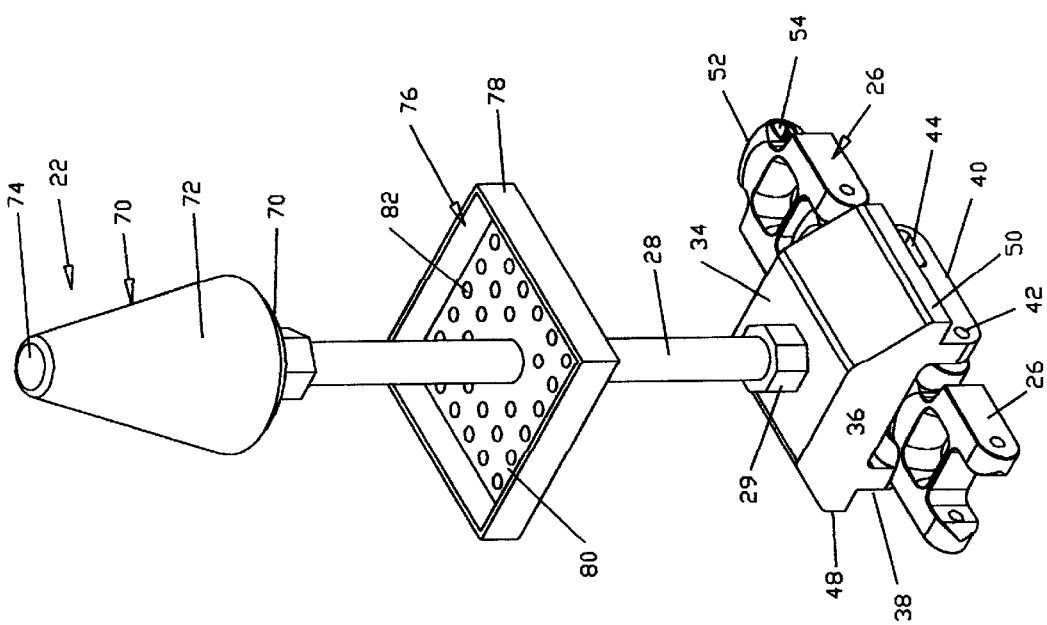

FIG. 5, wherein like numbers refers to like parts, shows a food product carrier used for conveying whole and portions of the whole poultry. A food support member 72 of the carrier includes a lower portion 70, which is a dome shape. At a point tangent to the dome, the middle food supporting portion 72 of the carrier is connected to the dome portion 70. The middle portion 72 maintains a conical shape starting with a smaller diameter on the top and ending with a larger diameter on the bottom. The upper portion 74 is a cap with a matching circumference as the top of the middle portion 72. Located at the approximate middle of the elongated shaft 28 is a square shaped tray 76 with small upwards-pointing sides 78. The bottom portion 80 of the tray has a small diameter bores 82 creating a perforated effect. The tray is used for the conveyance of both poultry parts and scrap.

Figure 6:
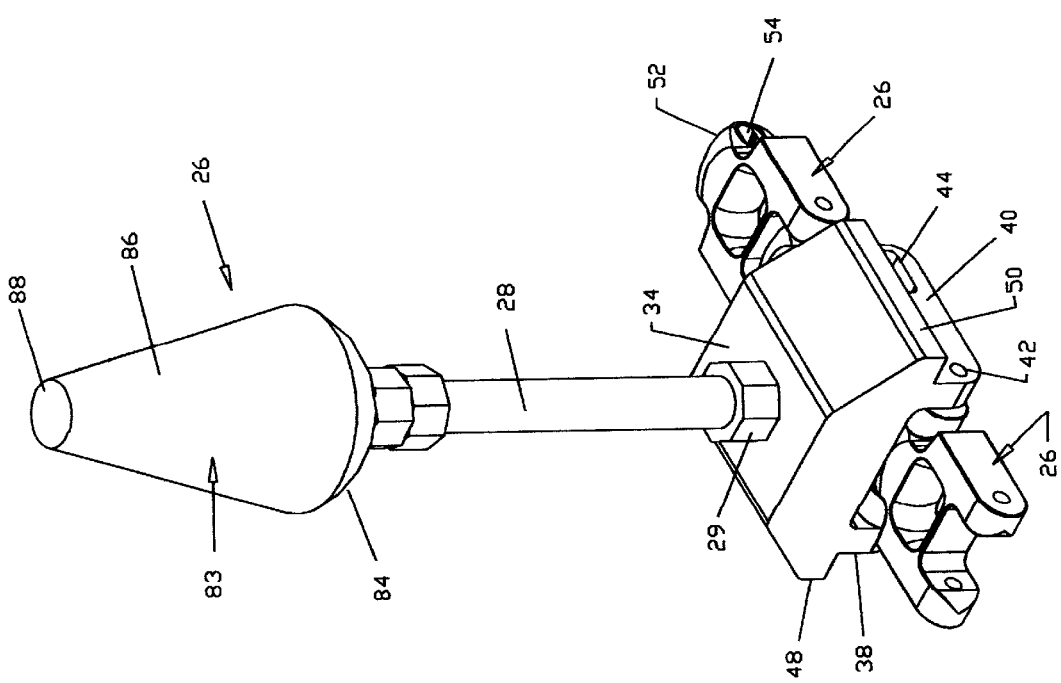

FIG. 6, wherein like numerals refer to like parts, shows a food product carrier 22 used for conveying whole and portions of whole poultry. A carrier food support member 83 includes a lower portion 84, which is a circular flat shape. The middle portion 86 of the food support member is connected to the circular flat portion 84. The middle portion 86 maintains a conical shape starting with a smaller diameter on the top 88 and ending with a larger diameter on the bottom 84. The upper portion 88 is a cap with a matching circumference as the top of the middle portion 86.

Figure 7:
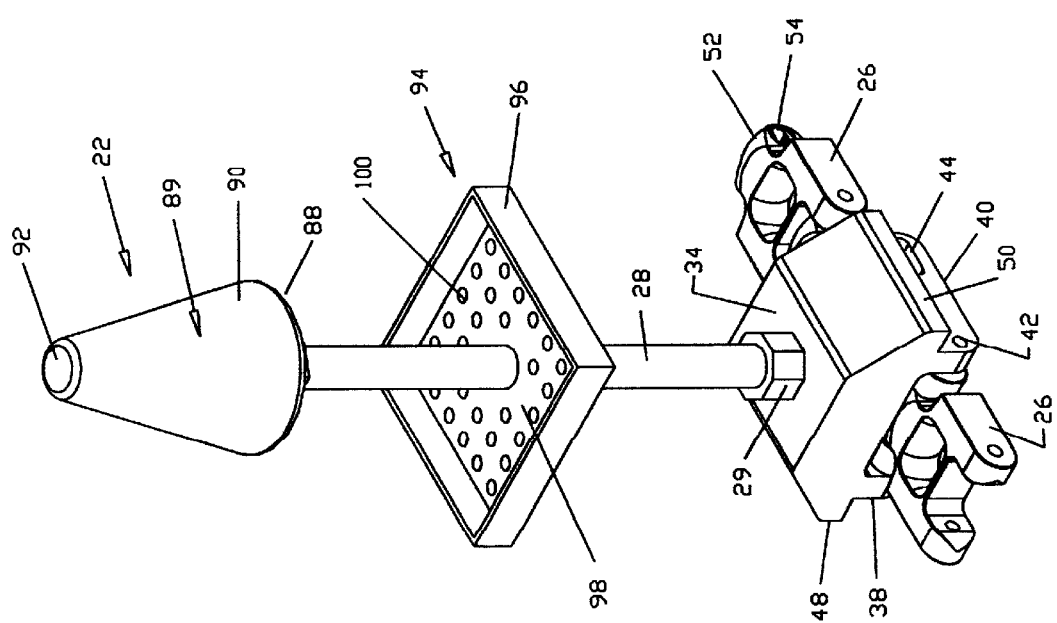

FIG. 7, wherein like numerals refer to like parts, shows a food product carrier used for conveying whole and portions of whole poultry. A carrier food support 89 member includes a lower portion 88, which is a circular flat shape. The middle portion 90 of the carrier is connected to the circular lower flat portion 88. The middle portion 90 maintains a conical shape starting with a smaller diameter on the top 92 and ending with a larger diameter on the bottom 88. The upper portion 92 is a cap with a matching circumference as the top of the middle portion 90. Located at the approximate middle of the elongated shaft 28 is a square shaped tray 94 with small upwards-pointing sides 96. The bottom portion 98 of the tray has small diameter bores 100 creating a perforated effect. The tray is used for the conveyance of both poultry parts and scrap.

Figure 8:
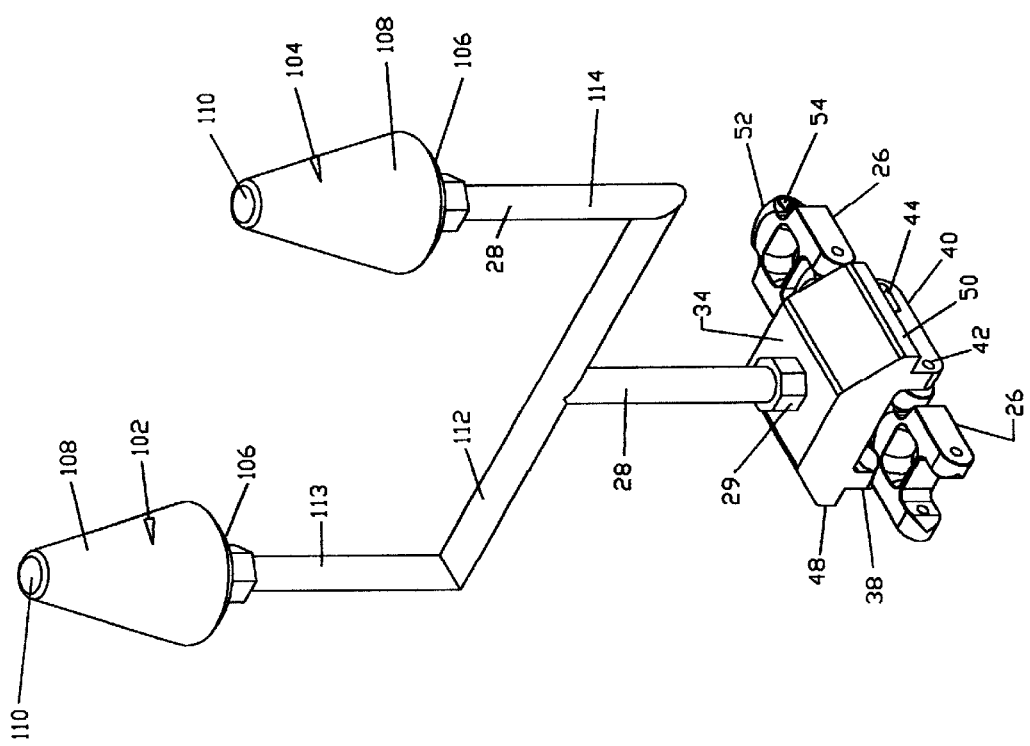

FIG. 8, wherein like numerals refer to like parts, shows a food product carrier used for conveying two whole and portions of the whole poultry. The carrier includes two food support members 102 and 104 having similar configurations. Each is provided with a lower portion 106 which is a dome shape. At a point tangent to the dome, the middle portion 108 of each support member is connected to the dome portion 106. The middle portion 108 maintains a conical shape starting with a smaller diameter on the top 110 and ending with a larger diameter on the bottom 106. The upper portion 110 is a cap with a matching circumference as the top of the middle portion 108. The elongated shaft 28 extending upwardly from mounting block 26 connects to a middle horizontal section 112 which then connects to two upper vertical sections 113 and 114 which support the food support members 102 and 104.

Figure 9:
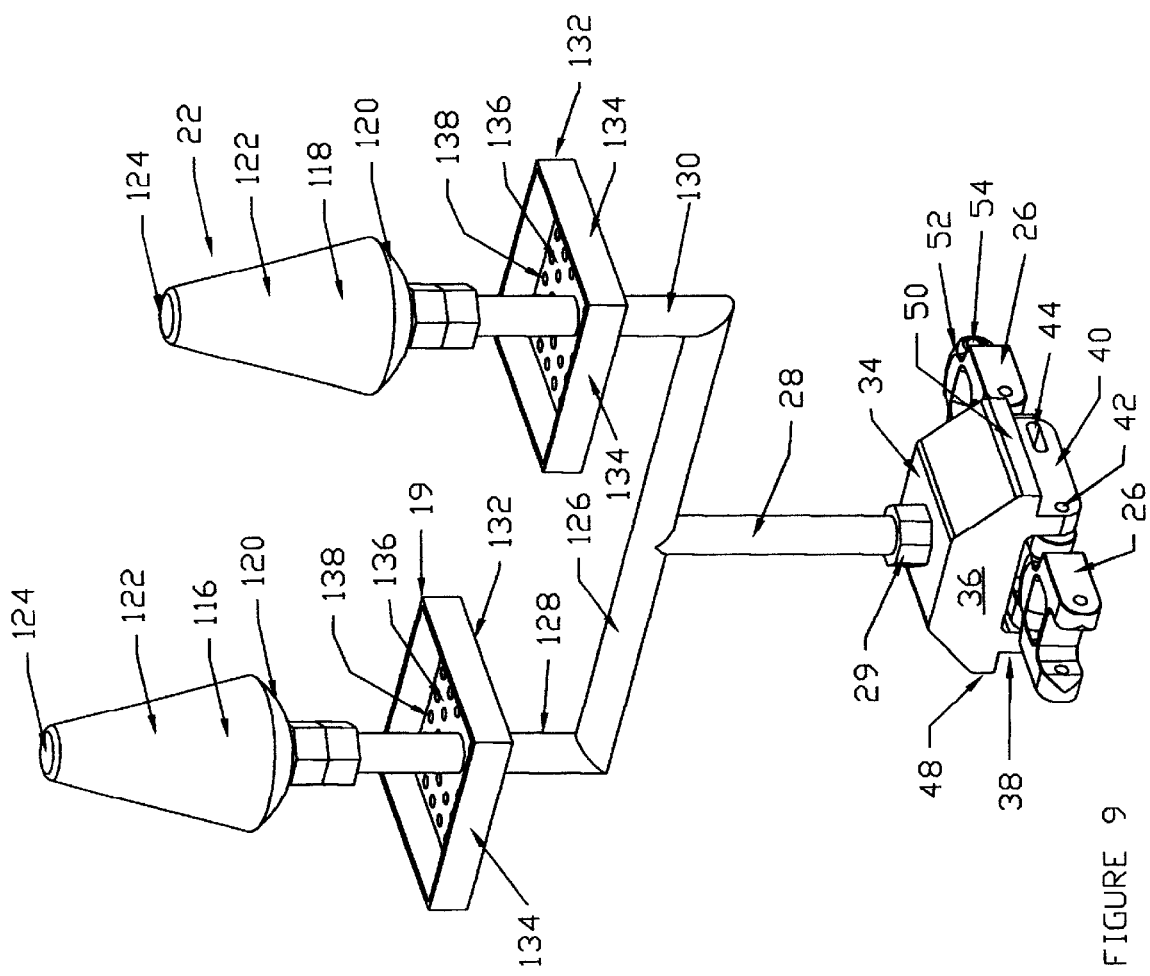

FIG. 9, wherein like numerals refer to like parts, shows a food product carrier used for conveying two whole and portions of the whole poultry. The carrier includes two food support members 116 and 118 having similar configurations. Each is provided with a lower portion 120 which is a dome shape. At a point tangent to the dome 120, the middle portion 122 of the carrier is connected to the dome portion. The middle portion 122 maintains a conical shape starting with a smaller diameter on the top 124 and ending with a larger diameter on the bottom 120. The top 124 is a cap with a matching circumference as the top of the middle portion 122. The elongated shaft 28 extending upwardly from mounting block 36 connects middle horizontal bar 126, which then connects to two upper vertical shafts 128 and 130 which support the food support members. Located at the approximate bottom of the elongated shafts 128 and 130 are square shaped trays 132 with small upwards-pointing sides 134. The bottom portion 136 of the tray has small diameter bores 138 creating a perforated effect. The trays are used for the conveyance of both poultry parts and scrap.

Figure 10:
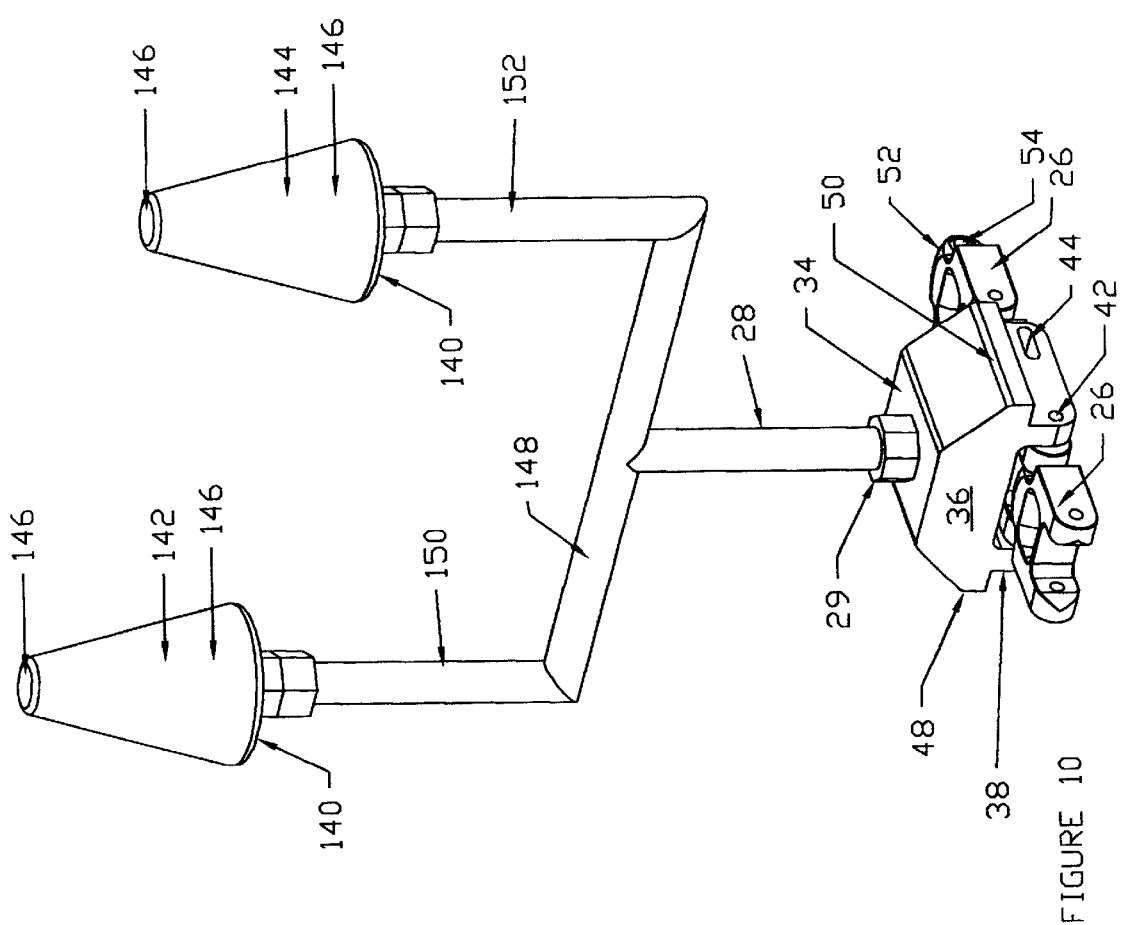

FIG. 10, wherein like numerals refer to like parts, shows a food product carrier used for conveying two whole and portions of the whole poultry. The carrier includes two food support members 142 and 144 having similar configurations. Each is provided with a lower portion 140 which is a circular flat shape. The middle portion 146 of members 142 and 144 is connected to the circular flat portion 146. The middle portion 146 maintains a conical shape starting with a smaller diameter on the top 146 and ending with a larger diameter on the bottom 140. The upper portion 146 is a cap with a matching circumference as the top of the middle portion 146. The elongated shaft 28 extending upwardly from block 26 connects to a middle horizontal section 148 which then connects to two upper vertical sections 150 and 152 which supports the food support members 142 and 144.

Figure 11:
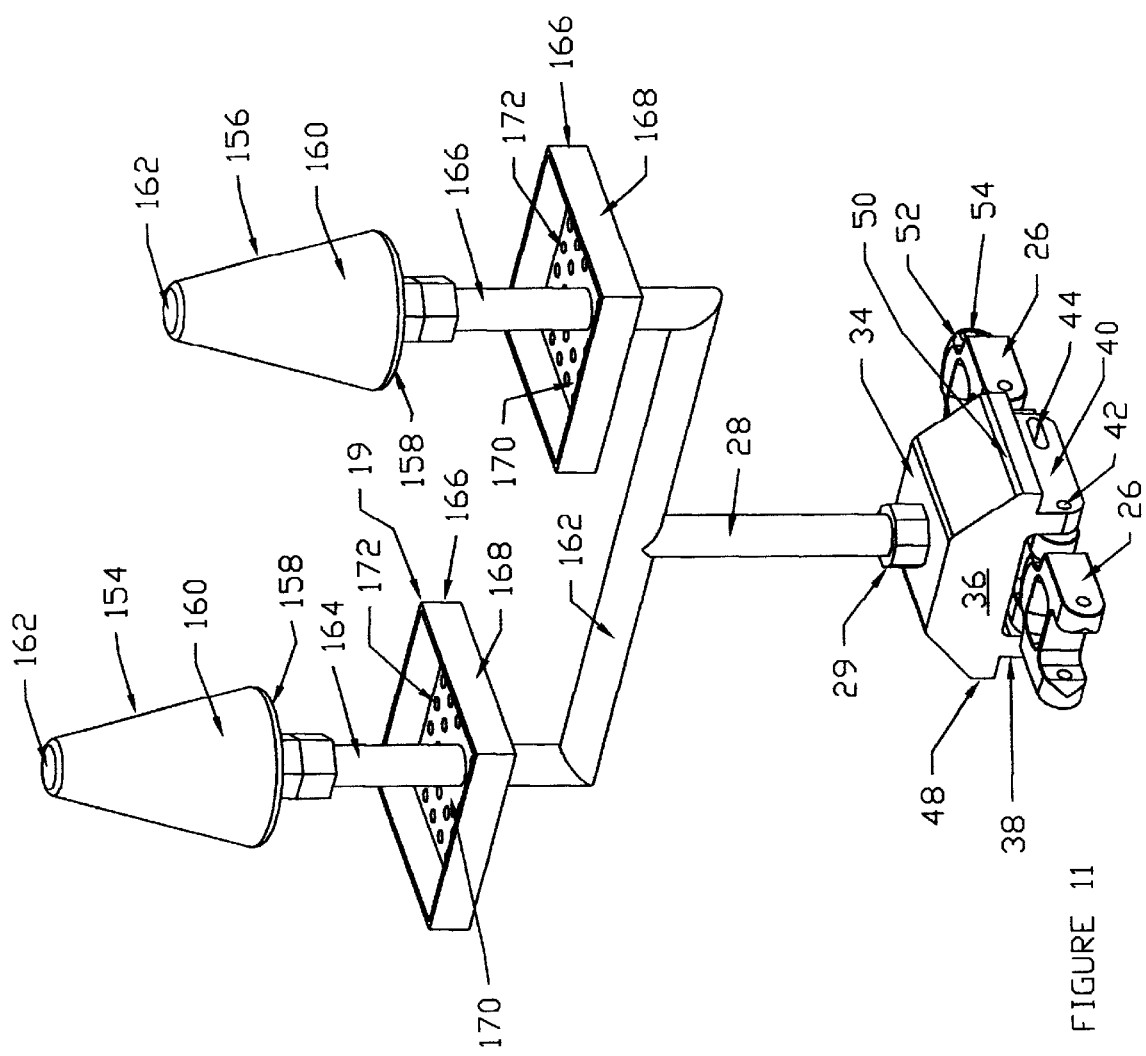

FIG. 11, wherein like numerals refer to like parts, shows a food product carrier used for conveying two whole and portions of the whole poultry. The carrier includes two food support members 154 and 156 having similar configurations. Each is provided with a lower portion 158 which is a circular flat shape. The middle portion 160 of the members 154 and 156 is connected to the circular flat portion 158. The middle portion 160 maintains a conical shape starting with a smaller diameter on the top 162 and ending with a larger diameter on the bottom 158. The upper portion 162 is a cap with a matching circumference as the top of the middle portion 160. The elongated shaft 28 extending upwardly from the mounting block 36 connects to a middle horizontal bar 162 which then connects to two upper vertical sections 164 and 166 which support food support members 154 and 156. Located at the approximate bottom of the elongated shaft 164 is a square shaped tray 166 with small upwards-pointing sides 168. The bottom portion 170 of the tray has small diameter bores 172 creating a perforated effect. The tray is used for the conveyance of both poultry parts and scrap.

Figure 12:
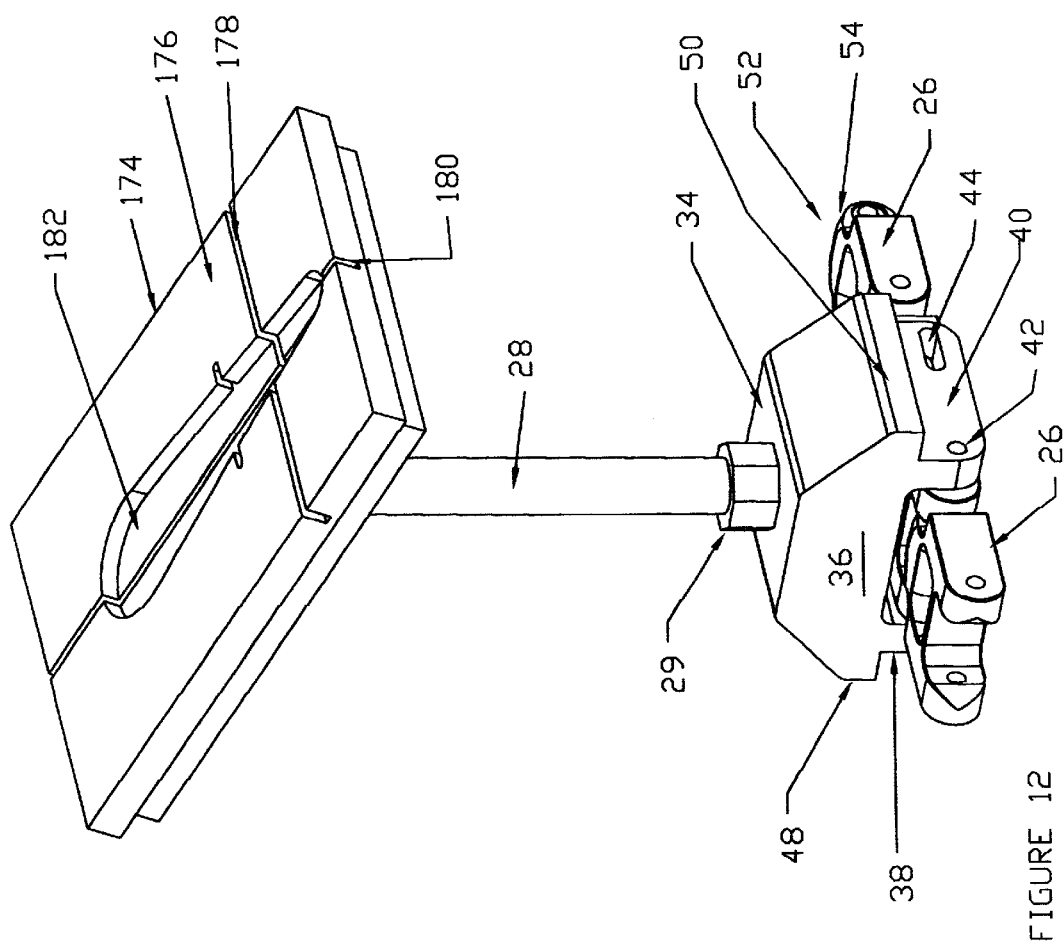

FIG. 12, wherein like numerals refer to like parts, shows a food product carrier used for conveying whole poultry tenders. The carrier includes a flat food support member 174 comprised of a plastic compound base plate 176 with a horizontal groove 178 cut full width of the base plate 176 and a vertical groove 180 cut full height of the base plate 176. The approximate center of the base plate 176 has a routed indention 182 to match the approximate size and shape of the poultry tenders.

Figure 13:
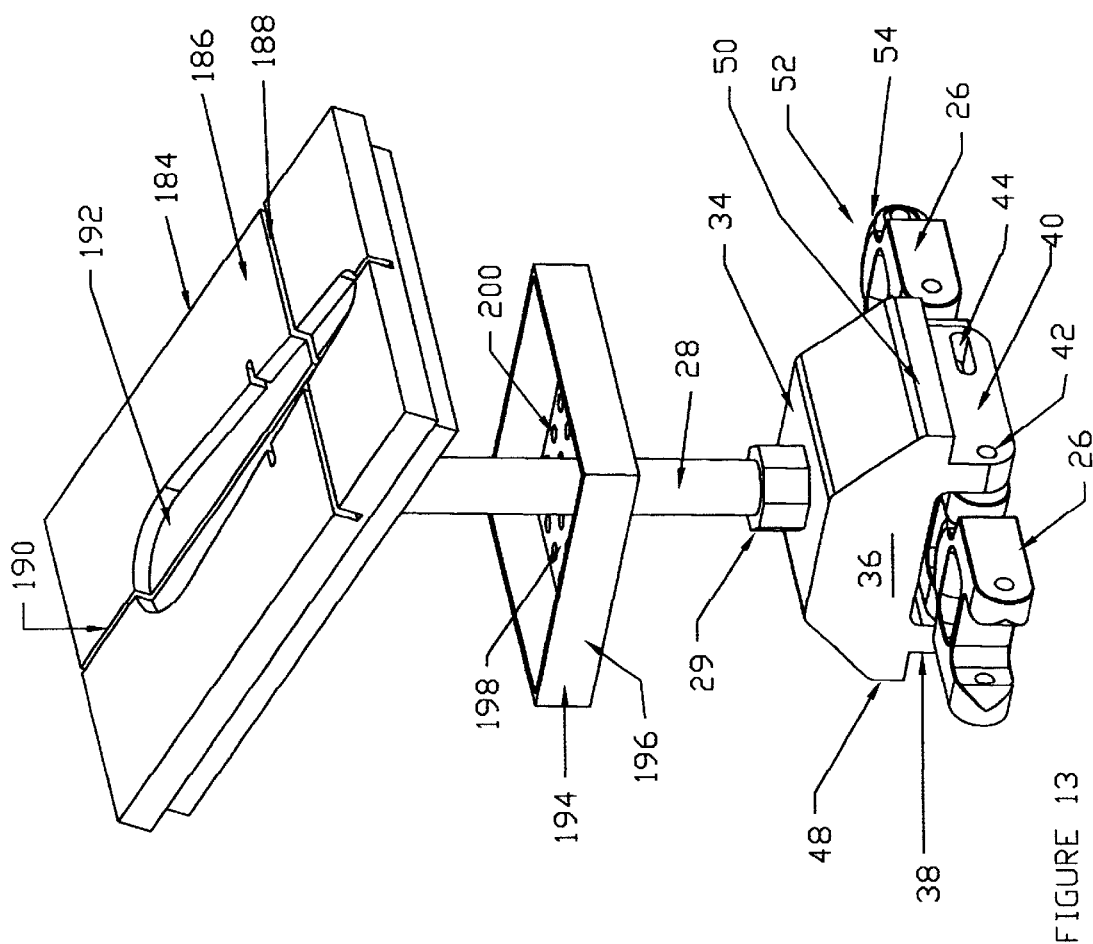

FIG. 13, wherein like numerals refer to like parts, shows a food product carrier used for conveying whole poultry tenders. The carrier includes a flat food support member 184 comprised of a plastic compound base plate 186 with a horizontal groove 188 cut full width of the base plate 186 and a vertical groove 190 cut full height of the base plate 186. The approximate center of the base plate 186 has a routed indention 192 to match the approximate size and shape of the poultry tenders. Located at the approximate center of the elongated shaft 28 is a square shaped tray 194 with small upwards-pointing sides 196. The bottom portion 198 of the tray has small diameter bores 200 creating a perforated effect. The tray is used for the conveyance of both poultry parts and scrap.

Figure 14:
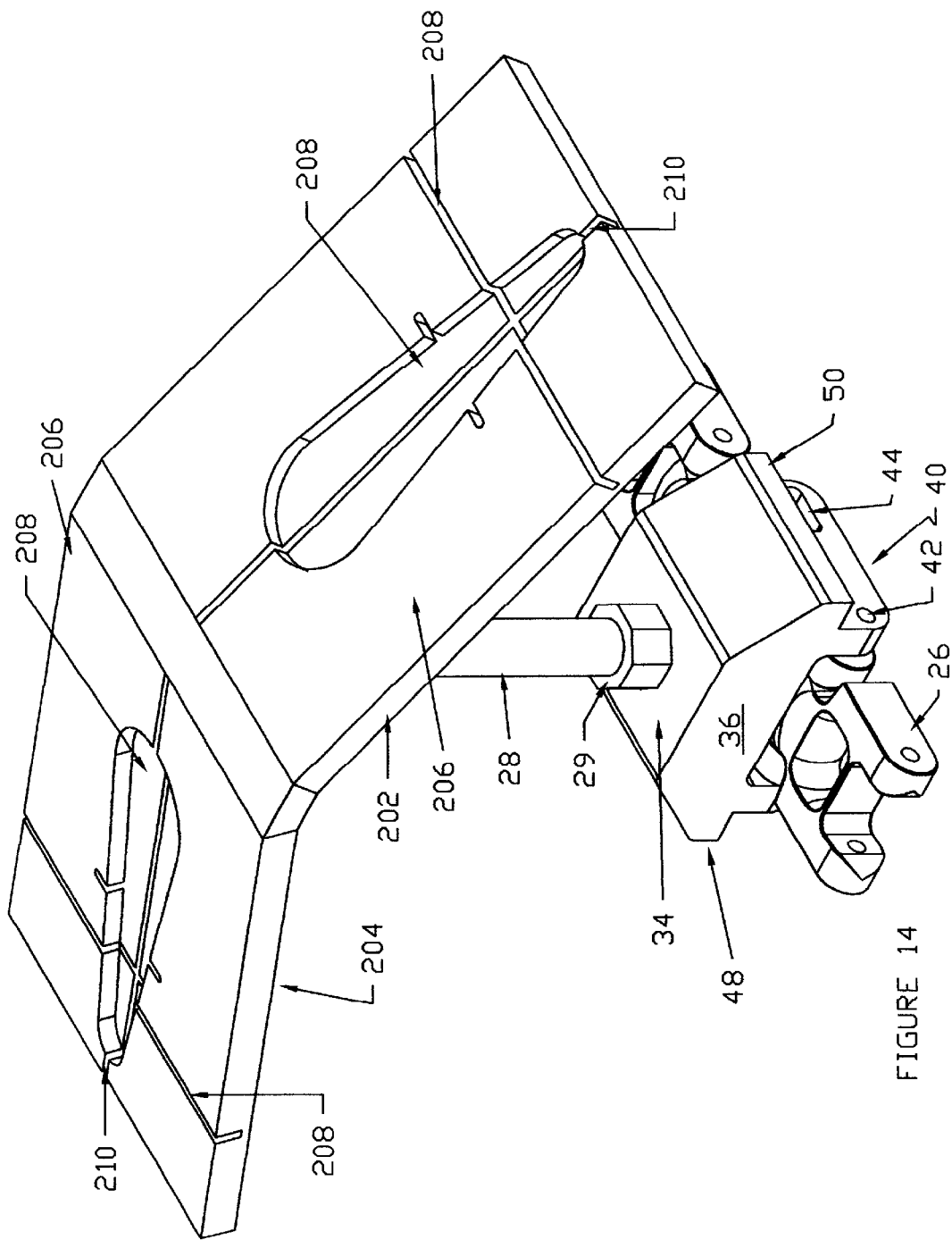

FIG. 14, wherein like numerals refer to like parts, shows a food product carrier used for conveying a plurality of whole poultry tenders. The carrier includes two flat food support members 202 and 204 having similar configurations. Each is comprised of a plastic compound base plate 206 with a horizontal groove 208 cut full width of the base plate 206 and a vertical groove 210 cut full height of the base plate 206. The approximate center of the base plate 206 has a routed indention 208 to match the approximate size and shape of the whole poultry tenders.

Figure 15:
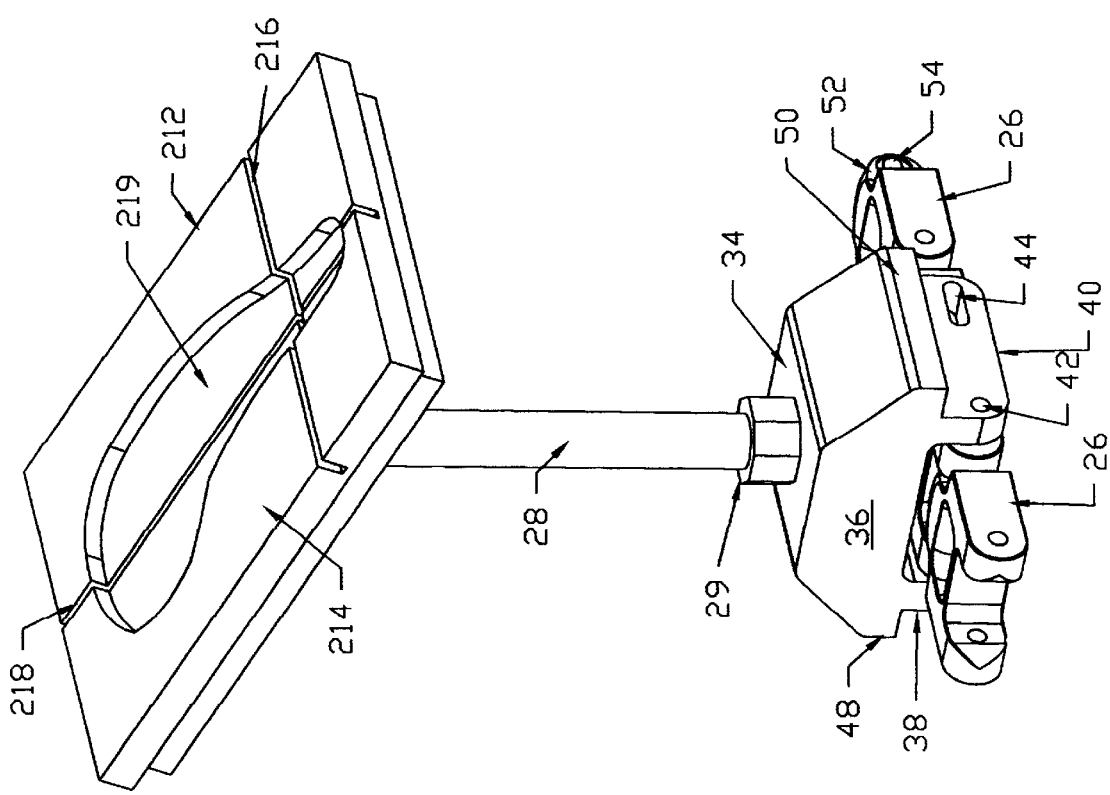

FIG. 15, wherein like numerals refer to like parts, shows a food product carrier used for conveying whole poultry breast fillets. The carrier includes a flat food support member 212 comprised of a plastic compound base plate 214 with a horizontal groove 216 cut full width of the base plate 214 and a vertical groove 218 cut full height of the base plate 214. The approximate center of the base plate 214 has a routed indention 219 to match the approximate size and shape of the breast filets.

Figure 16:
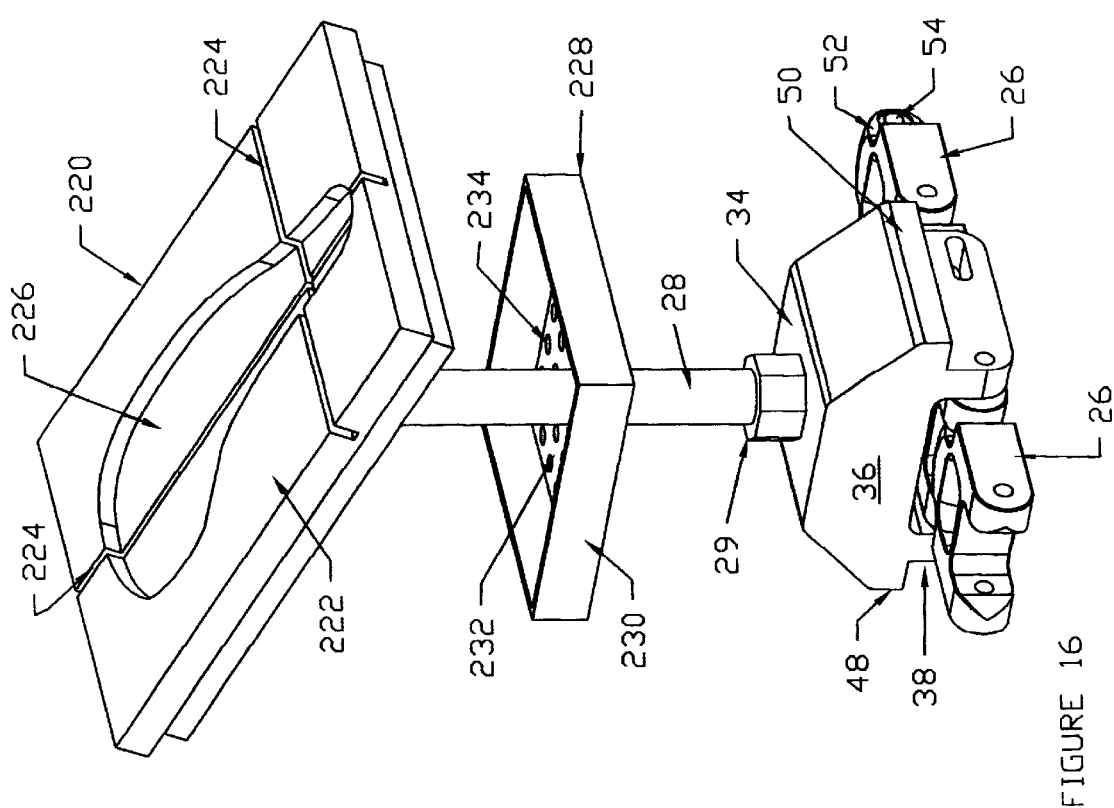

FIG. 16, wherein like numerals refer to like parts, shows a food product carrier used for conveying whole poultry breast fillets. The carrier includes a flat food support member 220 comprised of a plastic compound base plate 222 with a horizontal groove 224 cut full width of the base plate 222 and a vertical groove 224 cut full height of the base plate 222. The approximate center of the base plate 222 has a routed indention 226 to match the approximate size and shape of the poultry breast filet. Located at the approximate center of the elongated shaft 28 is a square shaped tray 228 with small upwards-pointing sides 230. The bottom portion 232 of the tray has small diameter bores 234 creating a perforated effect. The tray is used for the conveyance of both poultry parts and scrap.

Figure 17:
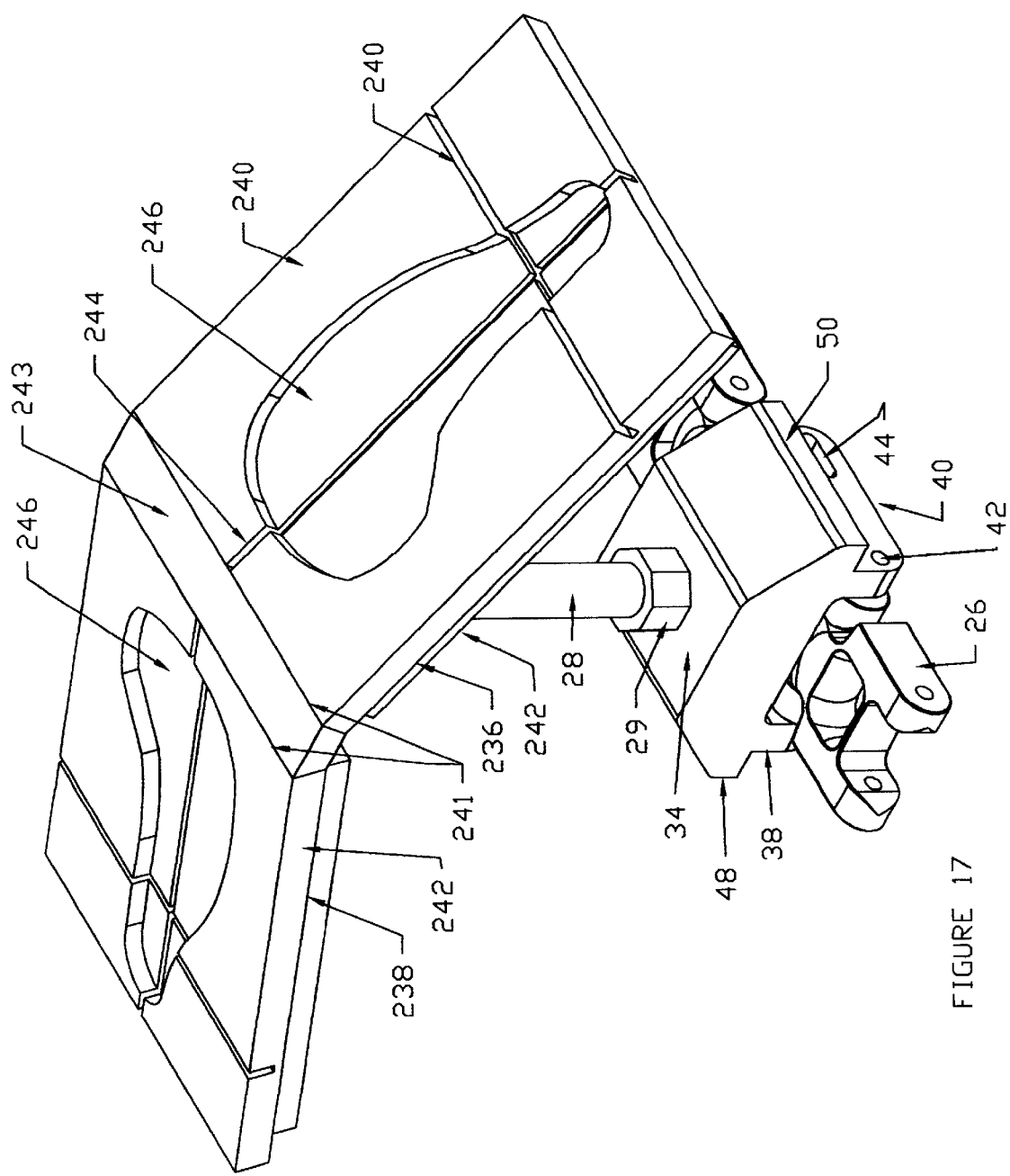

FIG. 17, wherein like numerals refer to like parts, shows a food product carrier used for conveying two whole poultry breast fillets. The carrier includes two flat food support members 236 and 238 comprised of a plastic compound base plate 240 with a horizontal groove 240 cut full width of the base plate 242 and a vertical groove 244 cut full height of the base plate 240. The approximate center of the base plate 242 has a routed indention 246 to match the approximate size and shape of the desired poultry part. The support members are spaced on opposite sides of shaft 28 and are angled upwardly to be joined at the ends at their ends 241 at a juncture plate 243.

Figure 18:
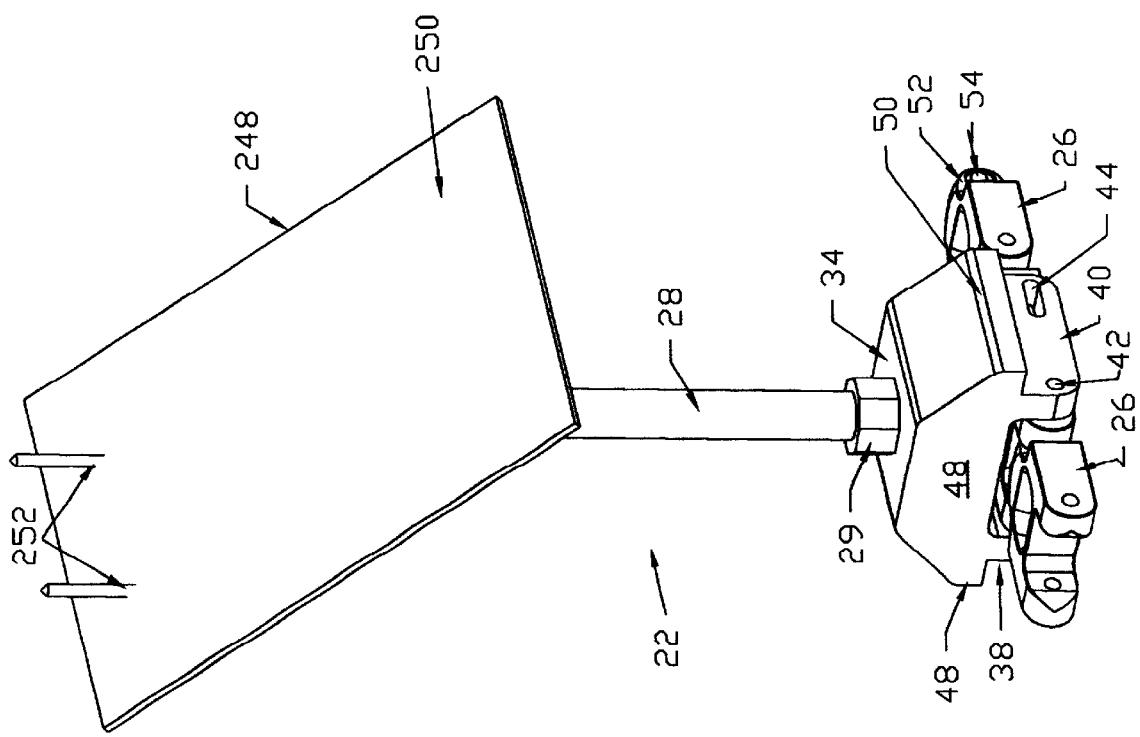

FIG. 18, wherein like numerals refer to like parts, shows a food product carrier used for conveying whole poultry leg quarters. The carrier 22 includes a tilted food support member 248 including a stainless steel base plate 250 approximately rectangular in shape. Located at the top of the base plate 250 are two stainless steel pins 252 which are affixed permanently to the base plate 250. The poultry parts will be supported in an inverted fashion by means of hanging the pieces from the pins 252.

Figure 19:
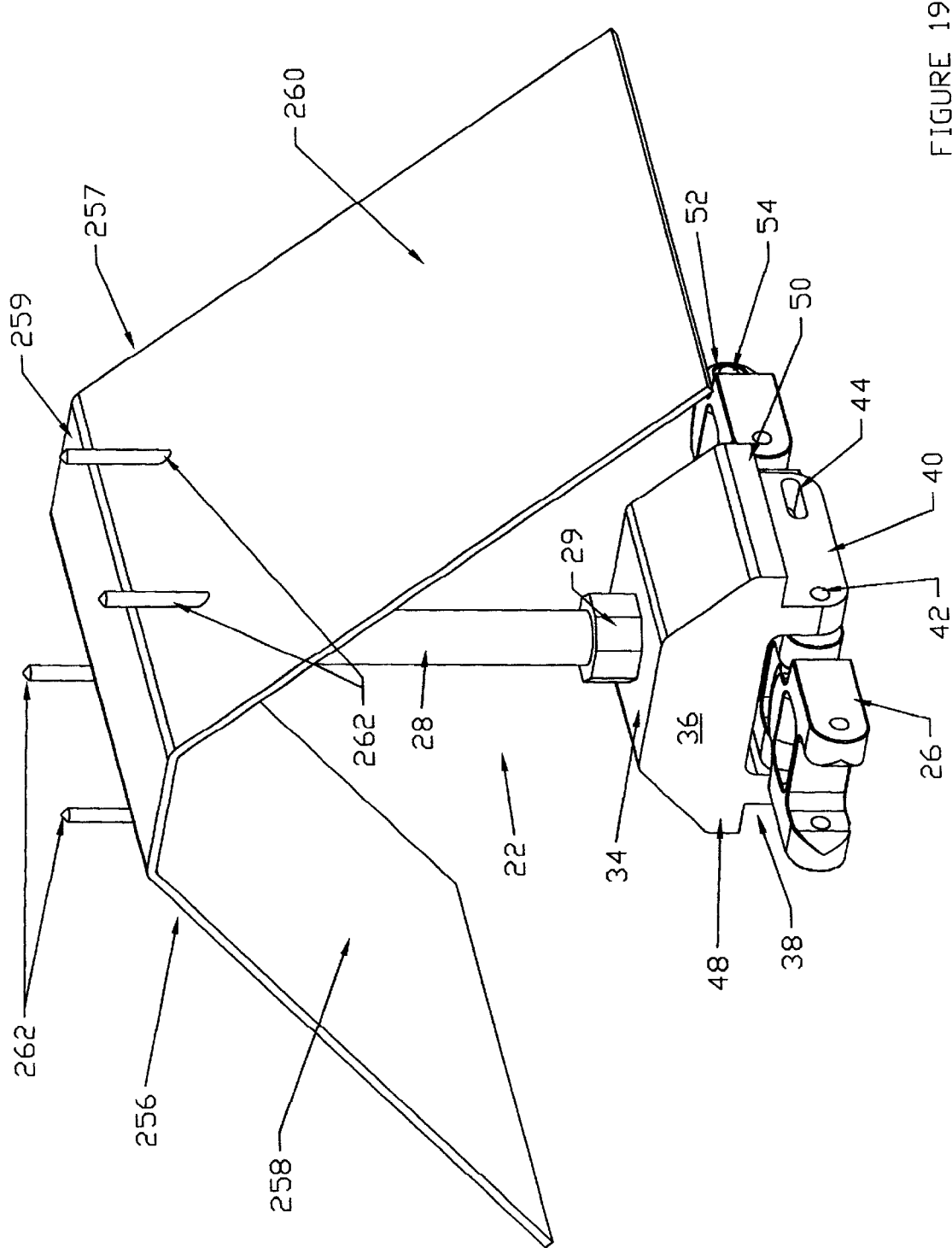

FIG. 19, wherein like numerals refer to like parts, shows a food product carrier used for conveying two wholes and two portions of whole poultry leg quarters. The carrier includes food support members 257 comprising two stainless steel base plates 258 and 260 approximately rectangular in shape. Located at the top of each base plate 258 and 260 are two stainless steel pins 262, which are affixed permantley to the base plates 258 and 260. The leg quarters will be supported in an inverted fashion by means of hanging them from the pins 262. The base plates are disposed on opposite sides of shaft 28 and are angled upwardly to be joined together at a juncture plate 259 which is secured to shaft 28.

Figure 20:
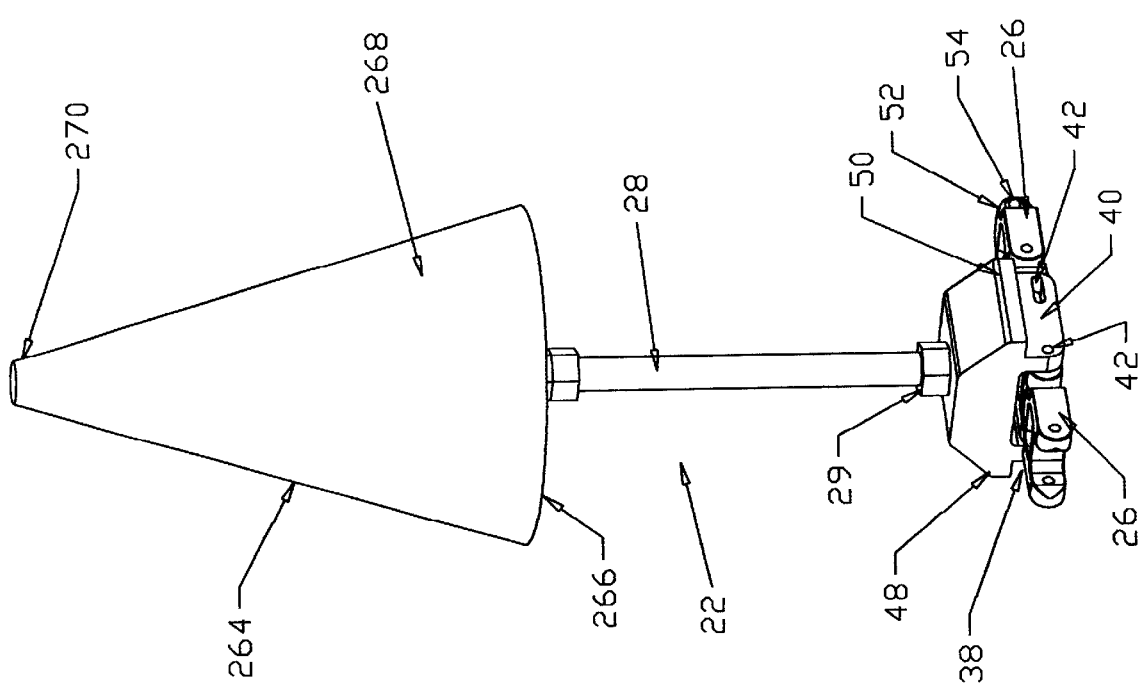

FIG. 20, wherein like numerals refer to like parts, shows a food product carrier for conveying extra large portions of whole poultry. The carrier includes an enlarged food support member 264 which is secured to shaft 28 and which is provided with a lower portion 266 which is a circular flat shape. The middle portion 268 of the carrier is connected to the circular flat portion 266. The middle portion 268 maintains a conical shape starting with a smaller diameter on the top 270 and ending with a larger diameter on the bottom 266. The upper portion 270 is a cap with matching circumference as the top of the middle portion 268.

Figure 21:
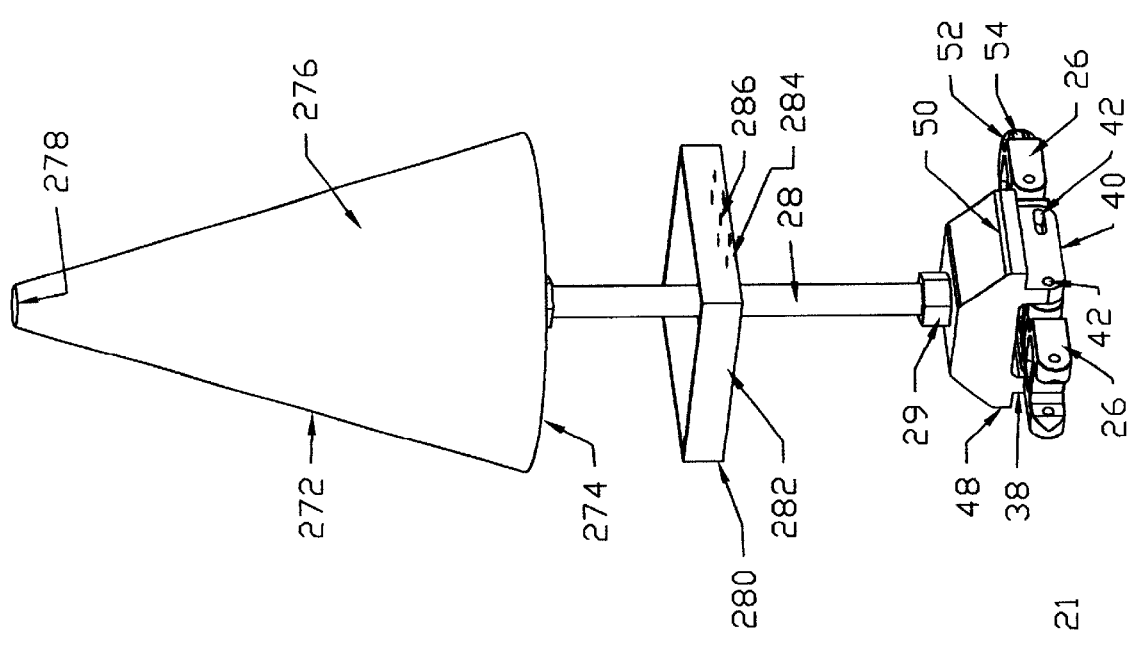

FIG. 21, wherein like numerals refer to like parts, shows a food product carrier for conveying extra large portions of whole poultry. The carrier includes an enlarged food support member 272 which includes a lower portion 274 which is a circular flat shape. The middle portion 276 of the carrier is connected to the circular flat portion 274. The middle portion 276 maintains a conical shape starting with a smaller diameter on the top 278 and ending with a larger diameter on the bottom 274. The upper portion 278 is a cap with matching circumference as the top of the middle portion 274. Located at the approximate middle of the elongated shaft 28, which extends upwardly from mounting block 36 is a square shaped tray 280 with small upwards-pointing sides 282. The bottom portion 284 of the tray has small diameter bores 286 creating a perforated effect. The tray is used for the conveyance of both poultry parts and scrap.

Figure 22:
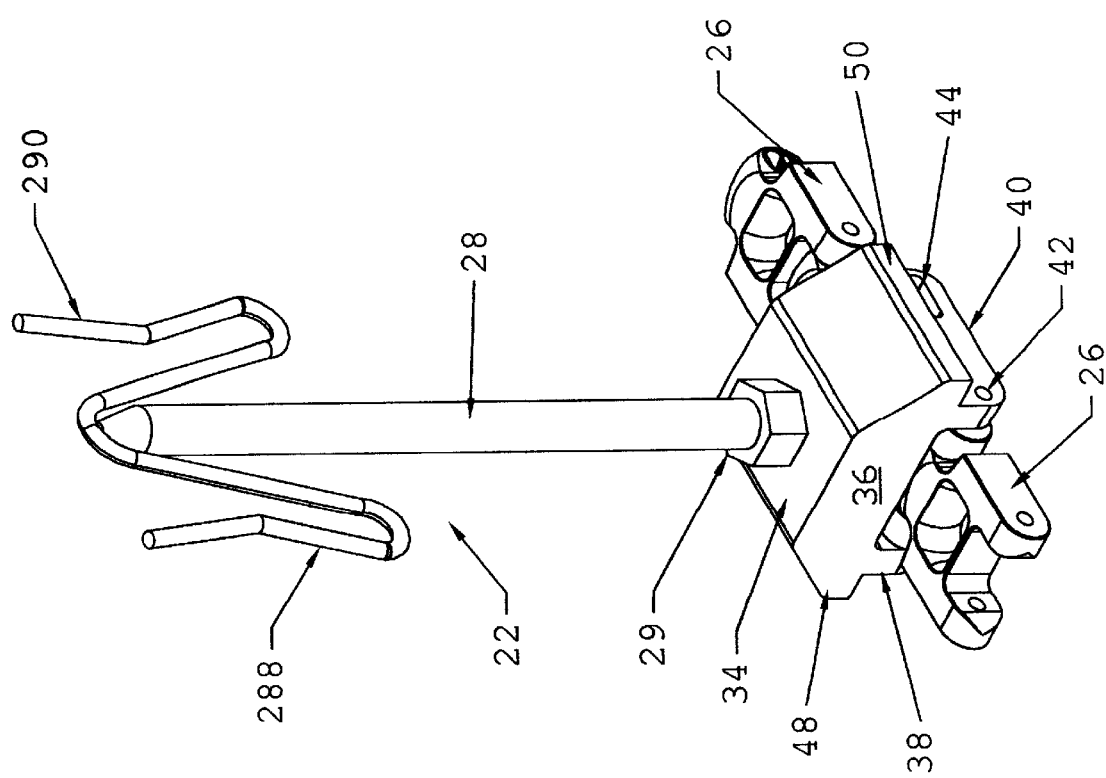

FIG. 22, wherein like numerals refer to like parts, shows a food product carrier for conveying whole and portions of whole poultry. The carrier includes a food support member 288 which consists of a stainless steel rod 290 bent in an approximate "W" shape. The whole or portion of whole poultry will be supported in an inverted fashion by means of hanging the piece from the double loops of the "W" shape.

FIG. 23, wherein like numerals refer to like parts, shows a food product carrier for conveying whole and portions of whole food products. The carrier includes a food support member 292 which includes a tray 294 with upward pointing sides 296. The tray includes a base 298 having small diameter bores 300 therethrough. The whole or portion of whole food product will be supported in the tray 294 and will be confined to the tray by the sides 296. Cutting and carving taken place on the food product while traveling along the processing line.

It is to be understood that a space exists between conveyor 12 and the takeaway conveyor 16 and the conveyor 14 and the takeaway conveyor 16. To prevent food from falling into this space, a cap 25 is releasably mounted on the top of the frame along the length thereof.

Also, as seen in FIG. 3, personnel ergonomic stands 27 are mounted along the frame. The stands are adjustable to accommodate the height of the meat cutter and are also foldable to be moved away from the meat cutter, as desired.

Thus, the present invention provides an advantageous apparatus for conveying whole and portions of whole food products along a processing line. The versatility is gained by the various and unique product carriers with each product carrier being designed in particular for a specific process. Each product carrier provides rigid stability for proper cutting and carving of meat portions. Additionally, each product carrier allows the highest yields of cuts and carves to obtained by providing a carrier, which compliments the shape and/or contour of the food part or carcass. Another asset of the invention is the design of the common frame support system. By combining the carrier conveyance system with the takeaway conveyance system, a tremendous amount of redundancy in leg frame support is eliminated thus reducing the amount of sanitizing required. Additionally, the proximity of the take-away conveyance is positioned in an optimum position in regards to the worker process station. Still another asset of the invention is to provide a versatile food processing line, which can be designed to accommodate plant layout configuration needs involving flexibility to travel along radius turns and elevation changes. The openness of the links and food carriers provides a food processing line, which may be easily and thoroughly cleansed. Finally, the invention provides a food processing line, which may be integrated into expanded or reduced processing capacity by means of adding or removing generic sections of conveyance.

What is claimed is:

1. A food processing apparatus, comprising:

frame;

a conveyor assembly connected to the frame;

a food carrier assembly having a mounting block removably connected to the conveyor assembly, the food carrier assembly including a mounting shaft and a food support member connected to the mounting shaft so that the food support member can be locked in place with respect to the mounting shaft, the mounting block including a wedge-shaped upper portion and a flanged lower portion extending downward from the upper portion, the lower flanged portion connected to the conveyor assembly.

2. The apparatus of claim 1, wherein the wedge-shaped upper portion includes:

a horizontal upper surface; and two side surfaces sloping downward away from the upper surface.

3. The apparatus of claim 1, wherein the conveyor assembly includes:

a guide adapted to slidably receive the wedge-shaped upper portion of the mounting block.

4. The apparatus of claim 3, wherein the guide includes a wedge-shaped channel.

5. The apparatus of claim 1, wherein the food support member is locked in place using two nuts.

6. The apparatus of claim 1, wherein the food carrier assembly further includes a tray connected to the mounting shaft.

7. The apparatus of claim 1, wherein the food support member has a conical shape.

8. The apparatus of claim 1, wherein the food support member is adapted to convey a poultry tender, the food support member including a flat plate having vertical and horizontal grooves and a routed indention shaped to match the size and shape of the poultry tender defined therein.

9. The apparatus of claim 1, wherein the food support member is adapted to convey a poultry breast fillet, the food support member including a flat plate having vertical and horizontal grooves and a routed indention shaped to match the size and shape of the poultry breast filet defined therein.

10. The apparatus of claim 1, wherein the food carrier assembly includes:

a rectangular, perforated tray connected to the mounting shaft so that the tray can be locked in place with respect to the mounting shaft.

11. The apparatus of claim 1, wherein the food carrier assembly includes a w-shaped food support member.

12. The apparatus of claim 1, wherein:

the mounting shaft includes a horizontal section and two vertical sections; and the food carrier assembly includes two food support members, each one connected and locked in place with respect to one of the vertical sections.

13. A food processing apparatus, comprising:

a frame;

a conveyor assembly connected to the frame, the conveyor assembly including a chain drive having a link; and a food carrier assembly removably connected to the link, the food carrier assembly including a flanged portion extending downward on opposite sides of the link and including a mounting shaft and a food support member connected to the mounting shaft so that the food support member can be locked in place with respect to the mounting shaft.

14. The apparatus of claim 13, wherein:

the food carrier assembly includes an upper portion having a horizontal upper surface and two side surfaces sloping downward away from the upper surface.

* * * * *